Patented June 29, 1954

2,682,531

UNITED STATES PATENT OFFICE 2,682,531

ZIRCONIUM TETRACHLORIDE-ETHER COMPLEXES AS LOW TEMPERATURE POLYMERIZATION CATALYST

John L. Ernst, Baton Rouge, La., and Robert M. Thomas, Westfield, N. J., assignors to Standard Oil Development Company, a corporation of Delaware No Drawing. Application March 31, 1951, Serial No. 218,702

11 Claims. (Cl. 260—85.3)

1

This invention relates to a low temperature polymerization process wherein an iso-olefin is polymerized alone or copolymerized with a polyolefin particularly a diolefin to form homopolymers and copolymers, and more particularly the process relates to a novel catalyst composition consisting of a zirconium tetrachloride-ether complex which is used as the active catalytic agent in the low temperature polymerization reaction.

It is known to produce an interpolymer of an iso-olefin such as, for instance, isobutylene, by polymerizing with a polyolefin such as, for example, isoprene or butadiene, at temperatures ranging from −20° C. to −165° C. by the application thereto of a Friedel-Crafts catalyst, the catalyst preferably being in solution in a low-freezing, non-complex-forming solvent. The resulting copolymerization reaction yields solid, rubber-like copolymers of high molecular weight that are reactive with sulfur in a curing reaction which is in some ways analogous to the vulcanization of rubber. These polymers show low unsaturation of iodine numbers 1 to 50 but are vulcanizable.

In order to produce these homopolymers and copolymers, isobutylene is one of the preferred components, but other isoolefins, such as 2-methyl butene-1, 2-methyl pentene-1 or 2-methyl-hexene-1, or iso-olefins of a similar type having from 3 up to 8 carbon atoms, may be used as well as some diolefins having an iso structure such as 2-methylpentadiene-1,3. In the preferred copolymerization process, from 99 to 40 weight percent of the iso-olefin is mixed with from 1 to 60 weight percent of a polyolefin having from 4 to 12 carbon atoms per molecule as, for example, isoprene or butadiene. Other polyolefins which may be used include piperylene, dimethyl butadiene, cyclopentadiene, dimethallyl, or myrcene. For most purposes, the conjugated diolefins having from 4 to 6 carbon atoms per molecule are preferred for copolymerization with iso-olefin. The olefinic mixture, usually diluted with from 1 to 3 volumes of inert diluent,

2 such as a low-freezing, halogenated alkane or alkane hydrocarbon per volume of mixture, is cooled to a temperature preferably within the range from −20° to −100° C. or even as low as −165° C. by the use of a refrigerating jacket around the reactor or by admixture with the polymerizable olefinic mixture of a combination refrigerant-diluent, such as liquid propane, liquid ethane, liquid ethylene or even liquid methane. Alternatively, solid carbon dioxide may be added directly to the reaction mixture to cool it to the required temperature.

Although zirconium chloride was previously known as a Friedel-Crafts catalyst, heretofore it was necessary to employ the catalyst as a slurry and it has thus demonstrated a very limited capacity to act as a low temperature polymerization catalyst. The use of a slurry catalyst such as must necessarily be employed when using $ZrCl_4$ alone generally gives poor polymers as a result of the lack of reaction control; also very poor efficiency due to coating of solid surface with film of polymers.

According to the present invention, the polymerization of the olefinic mixture is brought about by the application thereto of a solubilized zirconium-containing catalyst. Preferably, the catalyst employed is a zirconium halide-ether complex, the ether employed being selected from organic ethers which possess properties to make them particularly appropriate for complexing with zirconium halide. The zirconium-halide ether complex is preferably employed in the form of a solution and may be dissolved in an organic solvent which does not interfere or further complex with the catalyst and which is liquid at the polymerization temperature.

The zirconium containing Friedel-Crafts catalyst complexes of this invention are preferably used in solution in a low-freezing, non-complex-forming solvent, by which there is meant a solvent which will dissolve an adequate amount of the Friedel-Crafts catalysts, at least 0.3%. The solvent should have a freezing point substantially below 0° C., although it need not necessarily be as low as the polymerization temperature. In addition, the solvent should not form a stable complex with the Friedel-Crafts catalyst substance.

For the solvent, substantially any of the mono or poly halogenated alkanes having freezing points below about −10° C., as well as carbon disulfide, may be employed. Methyl chloride, methyl bromide, dichloromethane, ethyl chloride, and the like, are particularly useful. Hydrocarbon solvents, e. g. propane, butane, pentane, etc., in some cases may also be suited for use in the polymerization reactor.

Ethers which may be used for preparing the zirconium tetrachloride complexes include methyl and ethyl ether, di-n-propyl ether, di-isopropyl ether, the dibutyl ethers, the diamyl ethers, the dihexyl ethers, the dioctyl ethers, anisole and its derivatives, diphenyl ether, $\beta,\beta'$-dichloroethyl ether, $\alpha,\alpha'$-dichloroethyl ether, 1,2-diphenoxy ethane, o-chlorophenyl ethyl ether, $\beta$-chloroethyl phenyl ether, diethylene oxide, dichloromethyl ether, and the like.

It may be noted that there is no limitation upon the type of ethers useful in the formation of the etherate complexes. That is, the simple low molecular weight alkyl ethers, as methyl or ethyl ether, are operative for the purposes of the present invention as well as the higher molecular weight ethers, including the diamyl and dihexyl ethers, and the like. In general, organic ethers, including dialkyl ethers, aralkyl ethers, and aryl ethers, without especial regard to their composition or substituents, are effective for the present reaction. The ethers employed may be either symmetrical or unsymmetrical in their structure. It has been observed, however, that cyclic ethers, that is, those having the ether oxygen in a ring, are less effective; for instance, dioxane does not work. There appears to be no critical upper limit on the molecular weight of the ether employed.

One quite satisfactory method for preparing the preferred zirconium tetrachloride-ether complex catalyst solution is carried out by dissolving the appropriate amount of the complexing ether agent in the alkyl halide solvent and thereafter passing the alkyl halide-ether mixture through a bed of zirconium tetrachloride, thereby causing the formation of the zirconium tetrachloride-ether complex within the alkyl halide itself. The concentration of the catalyst in the final catalyst solution is thus dependent on the amount of ether dissolved in the alkyl halide.

In past practice, the well-known aluminum chloride catalyst solutions in alkyl halides, for instance, methyl and ethyl chloride, were prepared by passing the desired alkyl halide through a cartridge containing aluminum chloride. However, control of the concentration of aluminum chloride in the alkyl halide solvent is difficult because of changing solubility with temperature, rate of flow of the alkyl halide, and the necessity for diluting the original solution to obtain the desired concentration. Zirconium tetrachloride must be employed in solution for maximum effect. Furthermore, zirconium tetrachloride is insoluble in the alkyl halides alone. When the zirconium tetrachloride is used in the form of an ether complex, the complex is soluble in alkyl halides which can be employed as solvents for the catalyst. This type of operation is possible because of the formation of a molecular complex of the zirconium tetrachloride with numerous ether compounds such as $\beta,\beta'$-dichloroethyl ether, diphenyl ether, isopropyl ether, anisole, and various other ethers which are soluble in the alkyl halides. The method of preparing the catalyst solution offers the additional advantage that the amount of zirconium tetrachloride, the catalytic agent in the final solution, can be critically controlled by the amount of ether dissolved in the alkyl halide prior to its passage over the $ZrCl_4$.

If desired, the required proportion of $ZrCl_4$, the complexing agent and methyl chloride or other suitable solvent can simply be heated under reflux of the solvent or could be agitated near the boiling point of the solvent.

The catalyst solution prepared as above described or in some other convenient manner, is applied to the cold mixed olefinic material containing the iso-olefin and the polyolefin in the form of a spray delivered onto the surface of the rapidly agitated olefinic mixture. Alternatively, the catalyst solution may be delivered as a jet stream into a zone of high turbulence in the olefinic mixture in any convenient way or it may be delivered in any other way which produces a rapid dispersion of a catalyst solution into the cold olefinic mixture. The concentration of the active catalyst in the solution may vary between 0.05% and 15% by weight and generally the rate of addition of catalyst solution may vary between 0.05% to 5% per minute by weight based on the reactor contents. By adding more catalyst over a longer period of time, higher conversion will be obtained. The polymerization proceeds rapidly to yield a solid, rubbery copolymer having a Staudinger molecular weight which may vary between 20,000 and 100,000; the lower the polymerization temperature, the higher the molecular weight, all other factors in the reaction being equal. An iodine number measurement in the range above 50 up to 175 is preferred for the copolymer product.

This polymerization process, using the novel zirconium-containing ether complex, can be conducted either in successive batches or it can be conducted in a continuous process in which a steady stream of the olefinic feed material, refrigerant and catalyst stream is supplied to a reactor and a steady stream of overflow containing the copolymer, preferably in slurry form, results.

Following the polymerization reaction, the polymer is brought up to room temperature from the temperature of the polymerization reaction in any convenient manner, the preferred procedure being to dump the entire reaction mixture into warm water or a warm alkaline aqueous solution or warm alcohol or the like, in order to flash off remaining unpolymerized monomers and other volatile ingredients of the reaction mixture, quench the catalyst and start the purification of the copolymer. The copolymer is then washed on an open roll mill with clear water to obtain a further purification but it may, if desired, be purified in any of a number of other ways. If desired, the catalyst may be inactivated at low temperature (before warming up), by adding a small amount of a compound selected from the classes of alcohols, ethers, ketones, ammonia and amines. Ethyl or methyl or isopropyl alcohol, acetone, and ammonia are mostly preferred.

In utilizing the copolymer thus prepared, it is desirably compounded with a wide range of substances including zinc oxide, stearic acid, carbon black and various other pigments, fillers, and various vulcanizing, stabilizing, and improving agents.

This invention is based at least in part on the surprising discovery of the fact that the soluble complexes of zirconium tetrachloride, which have good catalytic activity for low temperature polymerizations, can be prepared. For example, the reaction product of equal molar proportions of zirconium tetrachloride with $\beta,\beta'$-dichloroethyl ether gives a catalyst of good solubility and catalytic activity. Similar good results have been obtained with the complex of zirconium tetrachloride with diphenyl ether. In general, it is believed that these catalysts are more rugged than ordinary polymerization catalysts in that they can withstand better the effect of interfering impurities.

Another very important feature of this invention is the discovery that using the solubilized zirconium tetrachloride catalyst compositions, surprisingly good results can be obtained in the preparation of a different type of copolymers. In fact, these catalyst compositions differ in unpredictable and highly significant respects from all other low temperature polymerization catalyst compositions heretofore known or disclosed to the art, such as the known catalyst compositions including aluminum chloride as well as the various soluble complexes of aluminum chloride and other Friedel-Crafts catalysts. The use of the solubilized zirconium tetrachloride catalyst compositions in the preparation of iso-olefin-diolefin type copolymers has shown by actual experiment to give significant product superiority over other known polymerization catalysts.

It is believed that the soluble zirconium catalysts, that is, the zirconium tetrachloride-ether complexes, exercise a somewhat different effect as catalysts for polymerizations than do other more typical Friedel-Crafts catalysts. For example, zirconium chloride appears to favor the polymerization of diolefins and when the solubilized zirconium catalysts are used for copolymerization of isobutylene and isoprene, they give polymers of unexpected high unsaturation, the iodine numbers being between 55 and 175. Substantial differences have been noted in both isobutylene-butadiene copolymer and isobutylene-isoprene copolymer.

EXAMPLE I

As an example of a specific embodiment of the invention, an olefinic feed mixture of isobutylene containing 7% by weight of isoprene, based on the amount of isobutylene, and diluted with about 75 weight percent of methyl chloride, was copolymerized with different catalyst solutions employing a continuous reactor refrigerated externally with liquid ethylene at a temperature in the range of approximately −95° to −103° C. In general, about 500 to 1000 grams of copolymer were made per gram of catalyst used. The results so obtained are shown in the data recorded in Table I below. The formulation used in preparing the samples for the curing tests was as follows.
Formulation:

| Component | Parts by weight |
| --- | --- |
| Polymer | 100 |
| Zinc oxide | 5 |
| Stearic acid | 3 |
| EPC carbon black | 50 |
| Tetramethyl thiuram disulfide | 1 |
| Mercaptobenzothiazole | 0.5 |
| Sulfur | 2 |

TABLE I

*Comparison of catalysts for isobutylene-diolefin polymerization*

|  | AlCl$_3$* | ZrCl$_4$ Complex** |
| --- | --- | --- |
| Mooney Viscosity (8 min.) | 35 | 53. |
| Unsaturation (mol percent by Br. No.) | 2.8 | 3.5. |
| Flow Properties: |  |  |
|   Total deformation | 55 | 41. |
|   Unrecoverable flow | 29.4 | 5.9. |
| Extrusion Characteristics: |  |  |
|   Inches per Min | 47 | 21. |
|   Grams per Min | 113 | 51. |
|   Swell | 2.4 | 2.4. |
|   Appearance | smooth | intermediate. |
| Cure @ 307° F.: |  |  |
|   10-min., tensile | 2,525 | 1,650. |
|   10-min., 300% modulus | 380 | 830. |
|   10-min., 400% modulus | 610 | 1,170. |
|   10-min., elong | 870 | 570. |
|   20-min., tensile | 2,700 | 1,850. |
|   20-min., 300% modulus | 730 | 1,260. |
|   20-min., 400% modulus | 1,100 | 1,740. |
|   20-min., elong | 670 | 430. |

*0.5 weight percent of AlCl$_3$ dissolved in methyl chloride.
**Equimolar complex of zirconium tetrachloride with $\beta,\beta'$-dichloroethyl ether employed as a 0.5 g./100 cc. solution in methyl chloride.

It is to be noted that the use of the zirconium tetrachloride-ether complexes resulted in a copolymer of greatly increased Mooney viscosity; the Mooney viscosity-molecular weight relationship indicating that a corresponding increase in molecular weight has resulted from the use of the improved catalyst. The zirconium tetrachloride ether complex also gave a copolymer of appreciably increased unsaturation and greatly reduced cold flow properties. With regard to the properties of the cured copolymer, the data of Table I indicate that there occurred a tighter cure as evidenced by the higher moduli and lower ultimate elongation values.

The improved results from the use of the zirconium tetrachloride ether complex are of particular interest and significance in view of the fact that they were obtained when copolymerizing an olefinic feed material of relatively high isoprene content. This indicates that the use of this novel catalyst may be a solution to the long-standing problem of producing a copolymer of an iso-olefin and a diolefin which has substantially more unsaturation than is present in the normal copolymer products of this type produced heretofore, and at the same time maintaining a good molecular weight relationship in order to give the necessary polymer properties, particularly in the cured rubber-like products.

EXAMPLE II

In an experiment similar to that described in Example I, a complex of zirconium tetrachloride and diphenyl ether of approximately equimolar proportions was employed as a catalyst for copolymerizing mixtures of major amounts of isobutylene and minor amounts of isoprene. Results comparable to those given by the dichloroethyl ether complex were obtained, polymer, of high unsaturation and satisfactory molecular weights as well as improved flow, extrusion and cure properties being produced.

EXAMPLE III

A set of experiments similar to those described in Example I was carried out, using, as polymerization feed, about 100 parts by weight of isobutylene and about 110 parts by weight of butadiene, this reaction mixture being diluted by 80% methyl chloride as diluent. The polymerizations were carried out in a continuous reactor employing liquid ethylene as an external refrigerant, the temperature of the reaction mixture being maintained at approximately −100° C. The results so obtained are shown in the data recorded in Table II below. The formulation used in preparing the samples for the curing tests was the same as that used for the samples of Example I.

TABLE II

*Comparison of polymers prepared using aluminum chloride and zirconium tetrachloride-ether catalysts*

| Catalyst [1] | $AlCl_3$ in methyl chloride | Zirconium Tetrachloride $\beta,\beta'$-dichloroethyl ether complex |
|---|---|---|
| Feed Rate, cc./Min | 900 | 900. |
| Catalyst Rate, cc./Min | 80–40 | 70–40. |
| Maximum Slurry Concentration | 7.5 | 8.9. |
| Fouling | Completely setup | None. |
| Mooney, 1.5–8 Min | 43–37 | 30–26. |
| Mole per cent Unsaturation (Hg Acetate) | 3.22 | 6.07. |
| Extrusion: | | |
| In./Mon | 43.5 | 45. |
| Gm./Min | 105.6 | 113.5 |
| Swell | 2.43 | 2.52. |
| Appearance | Smooth | Smooth. |
| Flow, Total Deformation, Percent | 51.3 | 59.8. |
| Unrecoverable Flow, Percent | 19.9 | 25.9. |
| Cures at 307° F.: | | |
| 10 Min.—Tensile Strength | 2,300 | 2,250. |
| 400% Mod | 1,020 | 1,400. |
| Percent Elong | 780 | 650. |
| 20 Min.—Tensile Strength | 2,775 | 2,350. |
| 400% Mod | 1,510 | 2,050. |
| Percent Elong | 700 | 480. |
| 40 Min.—Tensile Strength | 2,825 | 2,100. |
| 400% Mod | 1,980 | |
| Percent Elong | 610 | 380. |
| 80 Min.—Tensile Strength | 2,600 | 2,150. |
| 400% Mod | 2,150 | |
| Percent Elong | 590 | 350. |

[1] The amounts of catalyst used in each run were equivalent to about 0.25 g. of active catalyst per 100 cc. of catalyst solution.

Numerous advantages are evident from the use of the zirconium tetrachloride-$\beta,\beta'$-dichloroethyl ether complex as compared with the aluminum chloride catalyst. Less fouling was observed in the reactor. An increased unsaturation value is noted as measured by the mercuric acetate test. Both the time and gravimetric values for the extrusion test are better. In the data obtained on the cured samples, it should be noted that a faster cure was obtained, the process of this invention giving polymer which was substantially completely cured in 10 minutes, overcure being evident when longer cure times were employed. The marked increase in moduli values are again evident in the polymer prepared from the catalyst complex of zirconium tetrachloride and ether as compared with values found for the polymer obtained by the conventional aluminum chloride catalyst process.

What is claimed is:

1. The process of preparing a hydrocarbon polymer which comprises the step of polymerizing an iso-olefin having from 4 to 8 carbon atoms, at a temperature within the range of from −20° to −165° C., in the presence of a polymerization catalyst of zirconium tetrachloride complexed with an organic ether, R—O—R' in which R and R' are organic radicals.

2. The process of preparing a solid, plastic hydrocarbon interpolymer which is vulcanizable to yield an elastic, cured product, comprising the step of reacting together a major proportion of an iso-olefin having from 4 to 8 carbon atoms and a minor proportion of a conjugated diolefin having from 4 to 6 carbon atoms, at a temperature within the range of from −20° to −165° C., in the presence of a polymerization catalyst of zirconium tetrachloride complexed with an organic ether, R—O—R' in which R and R' are organic radicals.

3. The process of preparing a solid, plastic hydrocarbon interpolymer which is vulcanizable to yield an elastic, cured product, comprising the step of reacting together a major proportion of isobutylene with a minor proportion of a conjugated diolefin having from 4 to 6 carbon atoms, at a temperature within the range of from −20° to −165° C., in the presence of a polymerization catalyst consisting essentially of zirconium tetrachloride complexed with an organic ether, R—O—R' in which R and R' are organic radicals.

4. The process of preparing a solid, plastic hydrocarbon interpolymer which is vulcanizable and which has a Staudinger molecular weight within the range of 20,000 and 100,000 and an iodine number between 55 and 175, comprising the steps of admixing a major proportion of isobutylene with a minor proportion of a conjugated diolefin having from 4 to 6 carbon atoms, cooling the said mixture of olefins to a temperature within the range of from −20° to −165° C., and copolymerizing said mixture by the addition thereto of a solution of a catalyst consisting of zirconium tetrachloride complexed with an equimolar amount of an organic ether, R—O—R' in which R and R' are organic radicals.

5. The process of preparing a solid, plastic hydrocarbon interpolymer which is vulcanizable and which has a Staudinger molecular weight within the range of 20,000 and 100,000 and an iodine number between 55 and 175, which comprises the steps of reacting together a major proportion of isobutylene with a minor proportion of isoprene, at a temperature within the range of from −20° to −165° C., by the addition thereto of a zirconium tetrachloride-organic ether catalyst complex in solution in an inert, low-freezing diluent.

6. In a polymerization process in which a mixture of a major proportion of isobutylene and a minor proportion of a conjugated diolefin having from 4 to 6 carbon atoms is cooled to a temperature within the range between −20° to −165° C. and is copolymerized to produce a solid, plastic hydrocarbon interpolymer by the addition thereto of a polymerization catalyst, the improvement comprising the use of a dissolved polymerization catalyst complex consisting of an equimolar mixture of zirconium tetrachloride and an organic ether, R—O—R' in which R and R' are organic radicals, said complex dissolved in an inert, low-freezing diluent, whereby there is produced an interpolymer having an iodine number between 55 and 175.

7. In a polymerization process in which a mixture of a major proportion of isobutylene and a minor proportion of isoprene is cooled to a temperature within the range between −95° to −103° C. and is copolymerized to produce a solid, plastic hydrocarbon interpolymer by the addition thereto of a polymerization catalyst, the improvement comprising the use of a dissolved polymerization catalyst complex consisting of a zirconium tetrachloride - $\beta,\beta'$ - dichloroethyl - ether complex dissolved in an inert, low-freezing diluent, whereby there is produced an interpolymer having an iodine number between 55 and 175.

8. The process of preparing a solid, plastic hydrocarbon interpolymer which is vulcanizable and which has a Staudinger molecular weight within the range of 20,000 and 100,000 and an iodine number between 55 and 175, which comprises the steps of mixing together from 99 to 40 weight percent of isobutylene with from 1 to 60 weight percent of a conjugated diolefin having from 4 to 6 carbon atoms, diluting the olefinic mixture with from 1 to 3 volumes of an inert, low-freezing diluent, cooling said olefinic-diluent mixture to a temperature within the range between −20° and −165° C., and copolymerizing said olefinic mixture by the addition thereto of from 0.05 weight percent to 5 weight percent based on the total reaction mixture of a catalyst solution consisting of a zirconium tetrachloride-organic ether complex dissolved in an inert, low-freezing diluent, and the concentration of the active catalyst in the solution varying between 0.05 weight percent and 15 weight percent.

9. A process according to claim 8 in which the organic ether is $\beta,\beta'$-dichloroethyl ether.

10. A process according to claim 8 in which the conjugated diolefin is isoprene.

11. A process according to claim 8 in which the conjugated diolefin is butadiene.

References Cited in the file of this patent

UNITED STATES PATENTS

| Number | Name | Date |
| --- | --- | --- |
| 2,085,535 | Langedijk | June 29, 1937 |
| 2,142,980 | Huijser | Jan. 3, 1939 |
| 2,559,062 | Dornte | July 3, 1951 |